(No Model.)
N. H. STEWARD.
EXPANSION COVER FOR BOLTS.
No. 508,254. Patented Nov. 7, 1893.
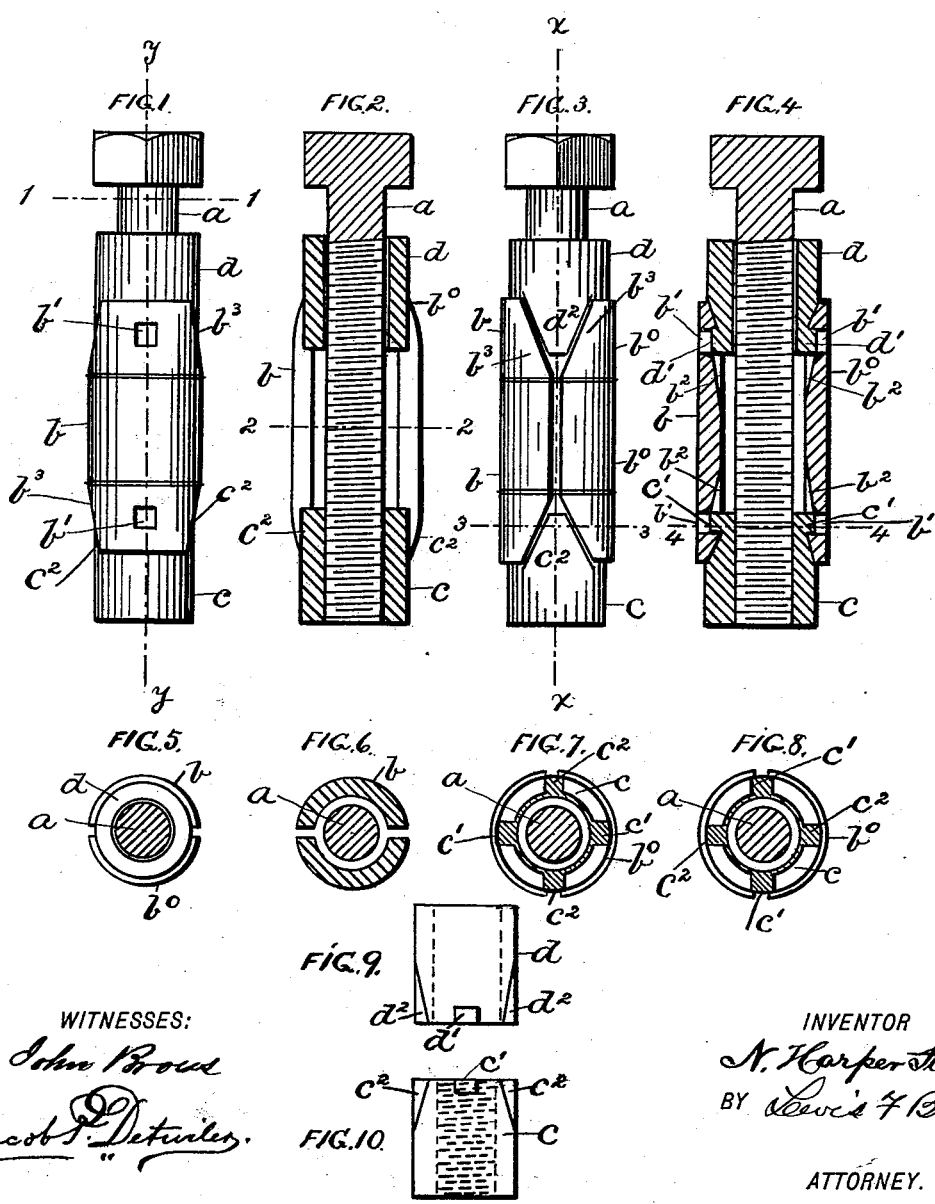
WITNESSES:
John Brous
Jacob F. Detwiler
INVENTOR
N. Harper Steward
BY Lewis F. Brous
ATTORNEY.
THE NATIONAL LITHOGRAPHING COMPANY,
WASHINGTON, D. C.

UNITED STATES PATENT OFFICE.

NATHAN HARPER STEWARD, OF PHILADELPHIA, PENNSYLVANIA, ASSIGNOR TO THE STEWARD & ROMAINE MANUFACTURING COMPANY, LIMITED, OF SAME PLACE.

EXPANSION-COVER FOR BOLTS.

SPECIFICATION forming part of Letters Patent No. 508,254, dated November 7, 1893.

Application filed February 16, 1893. Serial No. 462,621. (No model.)

*To all whom it may concern:*

Be it known that I, NATHAN HARPER STEWARD, a citizen of the United States, residing at Philadelphia, in the county of Philadelphia and State of Pennsylvania, have invented a new and useful Improvement in Expansion-Covers for Bolts, of which the following is a description sufficiently clear and exact as will enable others skilled in the art to which my invention appertains to make and use the same, reference being had to the drawings herewith.

This invention has reference to improvements in expansion covers for bolts, the well understood purposes of which are to secure stands, brackets, &c., to masonry, iron, or other surfaces, and for other purposes too numerous to describe, and the invention is hereinafter described.

By referring to the drawings herewith, it is intended to show a cheap, practical and thoroughly reliable construction as will cover all of the weak points of any make now in use.

The principal object sought to be covered by my improvement is the immediate action of the expansion covering upon the inner walls of the chamber or cavity where any power is applied to the bolt when the intention is to fasten it in position.

Referring to the drawings herewith, Figure 1, is a side elevation of the covering shown applied to a bolt of common form. Fig. 2, is a vertical section on line $x—x$ of Fig. 3. Fig. 3, is also a side view taken from a right angle point to the Fig. 1 view. Fig. 4, is a vertical section on line $y—y$ of Fig. 1. Figs. 5, 6, 7, 8, are cross-sections respectively on lines 1, 2, 3, 4. Fig. 9, is a side view of the circular sleeve and conical following washer. Fig. 10, is a side view of the circular and conical nut.

Similar letters have reference to like parts.

$a$, represents a screw threaded bolt of suitable shape to be used with an expansion covering.

$c$, is a nut also screw threaded and shown in the drawings as occupying a position at the extreme bottom part of the bolt $a$.

$d$, is a circular sleeve or washer of peculiar construction held in position under the head of the bolt and connected to the partially conical circular nut $c$, by means of the sectional circular covering $b$.

The screw threaded nut $c$ is constructed tapering at the end facing the sliding sleeve $d$, and at or near the small end of the tapering part of the screw threaded nut $c$, is provided with two small (and preferably square) lugs or teat-like projections $c'$, in directly opposite positions on or near the extreme edge of the tapering portion of the nut. In a directly transverse line on the tapering face of the said nut $c$, are two V shaped ribs $c^2$, $c^2$. The outer faces of the these ribs are of the same size and contour as the main body of the nut $c$. The circular sleeve or washer $d$, also tapering upon two opposite faces of the conical end, or the part facing the nut when all of the parts are in position on the bolt, is also provided with lugs or teat-like projections $d'$, similar in all respects to those on the nut $c$, and the sleeve or washer is also provided with V shaped ribs $d^2$ $d^2$ forming an integral part of the body of the sleeve, $d$, and having a similar contour to the outside circle of the latter.

The sectional shell covering interposed between the screw-threaded nut $c$, and the sleeve $d$ both constructed substantially as described, is composed preferably of two parts $b$ and $b^0$, both of which are exactly similar in shape having tapering ends $b^3$, at a similar angle to make them snugly fit the angle of the ribs $d^2$, and $c^2$, of the sleeve $d$ and nut $c$. Within the tapering portion or near each end of each section $b$ and $b^0$ of the circular shell covering are small openings $b'$, preferably square, to correspond to the shape of the lugs or teat-like projections $d'$ and $c'$ on the sleeve and nut respectively. Inclined channels $b^2$ lead from these openings to the inner walls of each of the parts of the sectional shell covering, and the metal under the tapering ends of the sectional shell covering opposite the inclined portions of both sleeve and nut is somewhat reduced in order to allow the said sections to easily ride up the said faces when the bolt is being forced into position. Suitable wire or rubber fastenings are used to assemble the bolt for transportation and use.

In the operation of my improved expansion covering, the assembled covering after being placed in the cavity or hole prepared to receive it, causes the outer face of the sleeve to shoulder against the bracket bar to be secured with the kind of a part to be supported in a manner mechanically understood. After having introduced the bolt sufficiently far enough to slightly tighten it, any further revolution of it by force causes the bolt to advance inwardly. The nut being so constructed and placed in the close fitting cavity is slightly forced in the opposite direction to the movement of the bolt, and the connections between the sleeve sliding loosely on the main body of the bolt by means of the connections between it and the nut, will cause the sectional covering to expand alike at all points on its surface, and thereby impinge and bind firmly against the inner walls of the cavity. It will readily be seen that as the bolt is being forced up to its full holding position the sliding conical sleeve butting against the bracket or part to be fastened, limits all outward movement of the nut, thereby in applying power to the bolt immediately operating the expansion covering.

I am aware that bolts have been provided with single and double wedge shaped nuts and sectional expansible side covers, and I do not therefore broadly lay claim to such; but What I do claim, and desire to secure by Letters Patent, is—

The combination of the sectional shell expansion covering $b$ having inclined tapering ends and provided with apertures $b'$ and inclined channels $b^2$, the screw-threaded partially tapering nut $c$ it being provided with diametric ribs and lugs on its inclined end, with similarly constructed sliding washer or sleeve $d$, with the screw bolt $a$, when constructed as described and arranged to operate in the manner and for the purpose set forth.

In testimony whereof I affix my signature in presence of two witnesses.

N. HARPER STEWARD.

Witnesses:
LEWIS F. BROUS,
JOHN BROUS.